Figure 1:
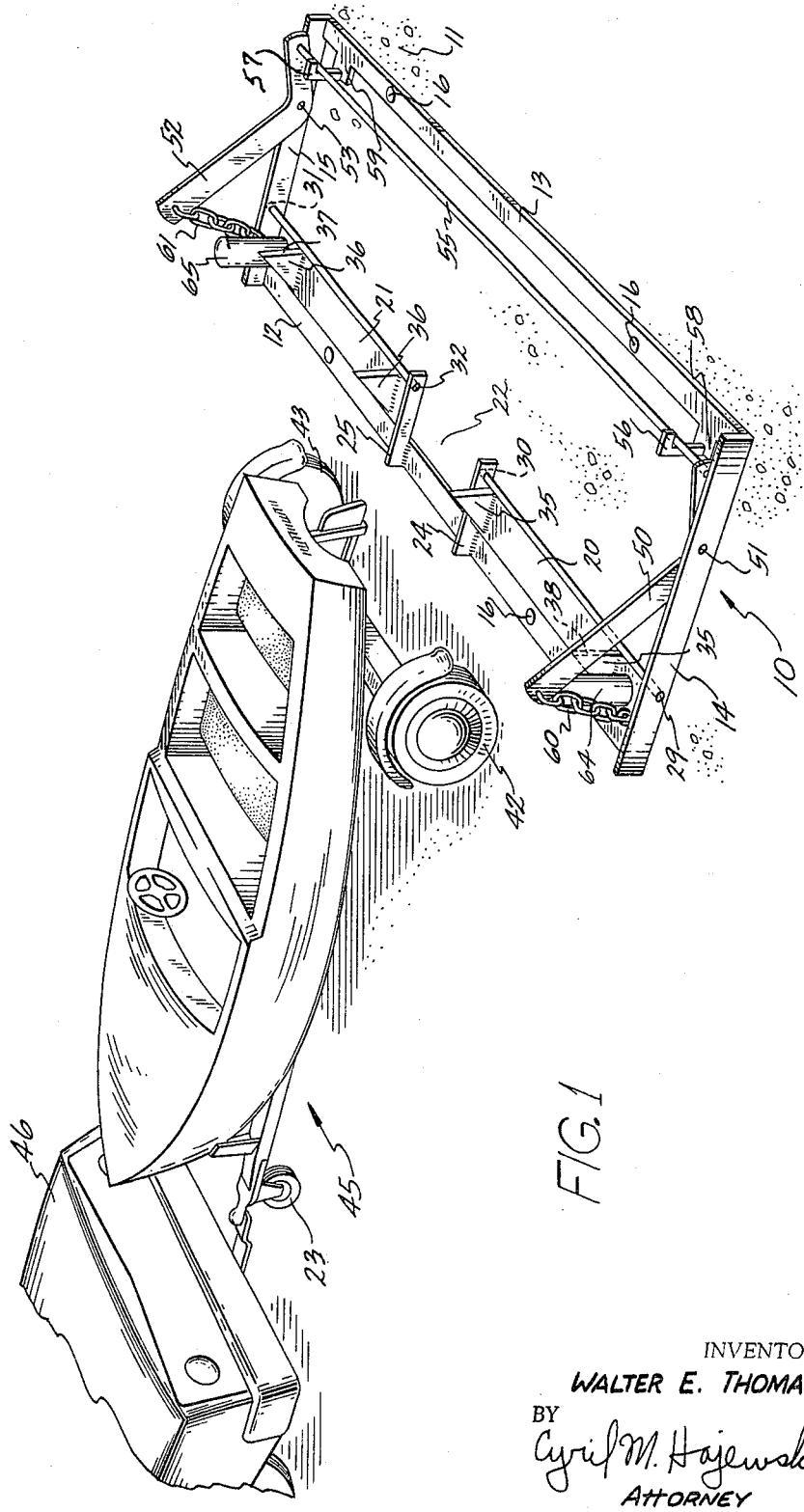

Nov. 29, 1966     W. E. THOMAE     3,288,252
BOAT RAMP SAFETY STOP
Filed July 16, 1964     2 Sheets-Sheet 1

INVENTOR.
WALTER E. THOMAE
BY
Cyril M. Hajewski
ATTORNEY

Nov. 29, 1966  W. E. THOMAE  3,288,252
BOAT RAMP SAFETY STOP

Filed July 16, 1964  2 Sheets-Sheet 2

INVENTOR.
WALTER E. THOMAE
BY Cyril M. Hajewski
ATTORNEY 3,288,252
BOAT RAMP SAFETY STOP
Walter E. Thomae, Milwaukee, Wis., assignor to Skobis Company, Milwaukee, Wis., a corporation of Wisconsin
Filed July 16, 1964, Ser. No. 383,096
7 Claims. (Cl. 188—32)

This invention relates generally to boat ramps and more particularly to an improved boat ramp incorporating a stop that does not interfere with the passage of the boat trailer into the water but presents a positive stop that prevents the passage of the boat towing vehicle beyond a predetermined point on the ramp to prevent its accidental movement into the water in which the boat is launched.

Boat ramps are provided at the shore lines of bodies of water to facilitate launching boats that are carried on a boat trailer while the trailer is attached to the vehicle that has towed it to the site. Such ramps are inclined from the shore downwardly into the water. The vehicle operator backs the boat trailer onto the ramp and continues rolling the trailer with the boat into the water. The boat is then released from the trailer and slid off of it into the water. Of course, the further the boat and trailer are located into the water, the easier it is to launch the boat off of the trailer. Since the ramp may be wet and slippery it frequently occurs that the vehicle operator loses control of the towing vehicle allowing it to roll down the ramp into the water. It has also happened that the vehicle slides down the ramp into the water during the boat launching operation after the driver has left the vehicle. Such accidental movement of the towing vehicle down the boat ramp may mire it in muck, or it may be submerged when the shore drops precipitously to produce deep water at the end of the boat ramp.

It is therefore a general object of the present invention to provide an improved boat ramp incorporating a safety stop that prevents accidental passage of the boat towing vehicle down the ramp and into the water.

Another object is to provide a safety stop on a boat ramp that does not interfere with the passage of the boat trailer over the ramp but limits the movement of the towing vehicle to prevent its accidental passage into the water.

Another object is to provide a vehicle stop on a boat ramp which will not interfere with the passage of the two rear wheels and the single front wheel of a three wheel boat trailer but will prevent the passage of the rear wheels of the towing vehicle beyond a predetermined point when the towing vehicle is being backed down the ramp to move the boat trailer and the boat thereon into the water.

Another object is to provide a vehicle stop on a boat ramp which is actuated to operating positions automatically by the passage of the boat trailer wheels over an actuating mechanism.

A further object is to provide a towing vehicle stop on a boat ramp that operates automatically without the employment of springs in the actuating mechanism.

A further object is to provide a boat ramp safety stop to limit the passage of the towing vehicle down the ramp with the safety stop being of simple and economical but sturdy construction while operating with outstanding efficiency.

According to this invention, the improved boat ramp safety stop comprises a frame that pivotally supports a pair of stops. The stops are spaced from each other to provide a centrally located gap between them for the passage of the front wheel of a three wheel boat trailer regardless of whether the stops are in the operative or inoperative positions. The pivotal mounting of the stops provides for pivoting the stops downwardly to the surface of the boat ramp for rendering them inoperative by allowing the passage of the boat trailer wheels over the stops. On the other hand, the stops may be pivoted in the opposite direction to their operative position wherein they extend upwardly from the boat ramp to interfere with the passage of the rear wheels of the towing vehicle down the ramp. As the boat trailer is backed down the boat ramp its two rear wheels pass over the inoperative stops, and after further movement toward the water beyond the stops they engage an actuating mechanism which operates to cause a pivotal movement of the stops to their operative position. Therefore, when the rear wheels of the towing vehicle reach the stops, the latter have been pivoted upwardly to their operative position so that the wheels engage the stops and the vehicle is unable to proceed any further down the ramp. Thus, the arrangement provides for uninterrupted passage of the boat and its associated trailer down the ramp into the water but the towing vehicle is limited in its movement to a safe position on the ramp.

Figure 2:
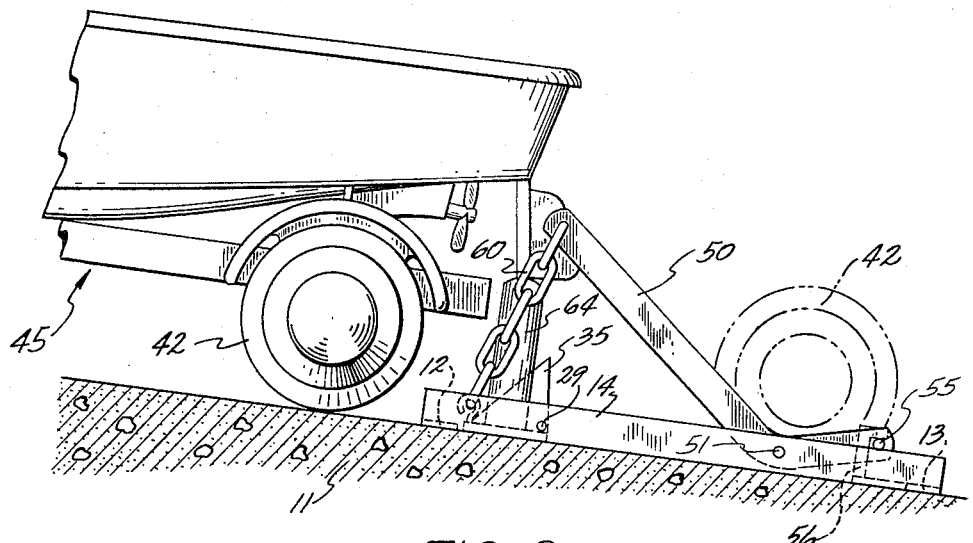
Figure 3:
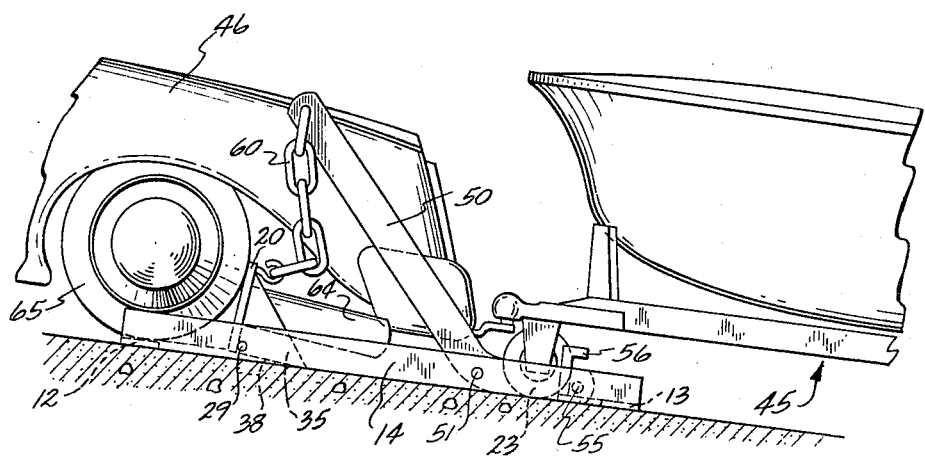

The foregoing and other objects of this invention, which will become more fully apparent from the following detailed description of an embodiment thereof may be achieved by the apparatus herein described by way of example in connection with the illustration of its structural components in the accompanying drawings, in which:

FIGURE 1 is a perspective view of a boat ramp safety stop incorporating the features of the present invention, the view also showing a boat and trailer about to be backed over the stop by a towing vehicle which is partially shown;

FIGURE 2 is a side elevational view of the safety stop illustrated in FIGURE 1 with the rear wheels of the boat trailer about to pass over the stop which is shown pivoted to its inoperative position; and FIGURE 3 is the same view shown in FIGURE 2 except that the trailer wheels are shown after they have passed beyond the stops and the latter are depicted pivoted upwardly to their operative position with the rear wheels of the towing vehicle against the stops to prevent further passage of the vehicle down the ramp.

Reference is now made more particularly to the drawings and specifically to FIG. 1 thereof which illustrates a boat ramp safety stop constructed in accordance with the teachings of the present invention. As there shown, the safety stop includes a frame generally identified by the reference numeral 10. The frame 10 is rigidly secured to the upper surface of a boat ramp 11 for mounting the safety stop in operating position.

The frame includes a front longitudinal member 12 and a parallel rear longitudinal member 13. The two members 12 and 13 are joined together by side pieces 14 and 15 that are parallel to each other to cooperate with the front and rear members 12 and 13 for forming the rectangular frame 10. The frame 10 is depicted as rigidly secured to the boat ramp 11 by screws 16 although it may be secured to the boat ramp 11 by any suitable means.

The frame 10 pivotably supports a pair of stops 20 and 21 which are spaced from each other to form a central gap 22 between the two stops for the passage of a front trailer wheel 23 of a three wheel boat trailer. In order to provide for the central gap 22 the stops 20 and 21 have their inner ends supported by a pair of bars 24 and 25 respectively. The bars 24 and 25 each have one end rigidly secured to the front member 12 and extend inwardly therefrom toward the inner portion of the frame 10 for pivotably supporting the stops 20 and 21.

The stop 20 is provided with a pin 29 that extends into a hole formed in the side piece 14 while a pin 30 extends from the opposite side of the stop 20 into a hole formed in the bar 24. The pins 29 and 30 are rotatable within their cooperating holes to support the stop 20 for pivotal movement with respect to the frame 10. Thus the stop 20 is shown pivoted to its inoperative position in FIG. 1 while the view in FIG. 3 illustrates the stop 20 pivoted upwardly from the position shown in FIG. 1 to its operative position for interfering with the passage of a vehicle down the ramp 11.

In like manner, the stop 21 is provided with a pin 31 extending from one end into a suitable hole formed in the side piece 15 while the opposite end of the stop 21 is provided with a pin 32 that extends into a hole formed in the end of the bar 25. The pins 31 and 32 are rotatable within their respective cooperating holes for pivotally supporting the stop 21 for pivotal movement from the inoperative position shown in FIGS. 1 and 2 to an operative position in which it extends upwardly from the boat ramp 11 as depicted in FIG. 3.

When the stops 20 and 21 are in their inoperative positions, their front face lies flat against the surface of the boat ramp 11 as clearly illustrated in FIGS. 1 and 2 to permit the passage of wheels over the back faces of the stops 20 and 21. The stops 20 and 21 are pivoted upwardly from this inoperative position to an operative position illustrated in FIG. 3 in which the stops extend upwardly from the surface of the boat ramp 11 to interfere with the passage of vehicular wheels down the ramp. The pivotal movement of the stops 20 and 21 from the inoperative position shown in FIGS. 1 and 2 is limited by a pair of triangular abutments 35 secured to the back face of the stop 20 to extend transversely therefrom. In like manner, the stop 21 is provided with a pair of identical triangular abutments 36 that extend rearwardly from the back face of the stop 21 in a direction transverse to the stop. The stops 36 are provided with bottom edges 37 that engage the surface of the boat ramp to limit the pivotal movement of the stop 21 in an upward direction from the position shown in FIGS. 1 and 2 and when the edges 37 engage the surface of the boat ramp the abutments 36 rigidly support the stop 21 in an upright operative position. In like manner, the abutments 35 are provided with bottom edges 38 that likewise engage the surface of the boat ramp and when this occurs the abutments 35 rigidly resist any further pivotal movement of the stop 20 in the same direction.

The stops 20 and 21 are pivotable to the inoperative position illustrated in FIGS. 1 and 2 to allow passage of the rear wheels 42 and 43 of a boat trailer generally identified by the reference numeral 45. However, after the wheels 42 and 43 have passed over the stops 20 and 21 it is necessary to pivot the stops upwardly to their operative position to render them effective for limiting the passage of a towing vehicle 46 down the ramp. To this end, an actuating mechanism is provided to be activated by the wheels 42 and 43 of the boat trailer 45 for pivoting the stops 20 and 21 to their operative positions illustrated in FIG. 3.

The actuating mechanism comprises a bell crank 50 pivotably supported by a pin 51 that is carried by the side piece 14 of the frame 10. A corresponding bell crank 52 is pivotably carried on the opposite end of the frame 10 by a pin 53 which is mounted on the side piece 15. The bell cranks 50 and 52 are joined to each other by an elongated rod 55 so that they pivot in unison about their respective pins 51 and 53. The rod 55 extends through the entire length of the frame 10 with one end being secured to the bell crank 50 while the opposite end is secured to the bell crank 52. In order to limit the pivotal movement of the bell cranks 50 and 52 in a counterclockwise direction as viewed in the drawings, a pair of stops 56 and 57 are provided for limiting the upward movement of the rod 55. The stop 56 is secured to a plate 58 which, in turn, is secured to the rear member 13. In like manner, the stop 57 is mounted on a plate 59 that is also fixed to the rear member 13. Thus, as the bell cranks 50 and 52 pivot in a counterclockwise direction as viewed in the drawings, the rod 55 moves with them in an upward direction until it engages the two stops 56 and 57. This serves to prevent any further pivotal movement of the bell cranks 50 and 52 in the counterclockwise direction.

The end of the bell crank 50 opposite the end connected to the rod 55 has one end of a chain 60 secured to it with the opposite end of the chain being attached to the upper edge of the stop 20. In identical manner, the end of the bell crank 52 opposite the end connected to the rod 55 has one end of a chain 61 attached to it with the opposite end of the chain 61 being secured to the upper edge of the stop 21. The chains 60 and 61 are of such length as to have very little slack in them when the bell cranks 50 and 52 are in their extreme counterclockwise pivotal position and the stops 20 and 21 are in their inoperative position with their front faces lying flat against the surface of the boat ramp. Accordingly, when the bell cranks 50 and 52 are pivoted in a clockwise direction from the position shown in FIGS. 1 and 2, they draw the stops 20 and 21 respectively with them in the same pivotal direction for shifting the stops to their operative positions as illustrated in FIG. 3.

The stop 20 is provided with a ballast 64 extending outwardly from its rear face. An identical ballast 65 extends outwardly from the rear face of the stop 21. The ballasts 64 and 65 are provided for actuating the stops 20 and 21 in their pivotal movement toward the operative positions after they have been pivoted a relatively small distance by the pivotal action of the bell cranks 50 and 52. After the initial pivotal movement of the stops 20 and 21 occurs, the ballasts 64 and 65 are in position to shift the center of gravity of the unit for completing the pivotal movement of the stops 20 and 21 to their operative positions illustrated in FIG. 3. The provision of the ballasts 64 and 65 minimizes the amount of pivotal movement required in the bell cranks 50 and 52 and provides for a positive shifting of the stops 20 and 21 to their operative positions.

In operation, the stops 20 and 21 are initially in their inoperative positions as illustrated in FIGS. 1 and 2. The boat trailer 45 is backed down the boat ramp by the towing vehicle 46 as shown in FIG. 1. The movement of the trailer 45 is continued rearwardly so that the wheels 42 and 43 of the trailer pass over the front member 12 and the back faces of the stops 20 and 21. The wheels continue in this direction and engage the rod 55 with the continued rolling movement of the wheels 42 and 43 in a rearward direction into the water forcing the rod 55 downwardly toward the surface of the boat ramp. This, of course, produces a unitary pivotal movement of both bell cranks 50 and 52 in a clockwise direction as viewed in the drawings, and by reason of the connection of the stops 20 and 21 to the ends of the bell cranks 50 and 52 by the chains 60 and 61 the stops 20 and 21 are pivoted with the bell cranks 50 and 52 in a clockwise direction as viewed in the drawings. The initial pivotal movement of the stops 20 and 21 is effected by the pivotal movement of the bell cranks 50 and 52. This initial pivotal movement shifts the ballasts 64 and 65 so that they take over to complete the pivotal movement of the stops 20 and 21 to their operative positions as illustrated in FIG. 3. The stops 20 and 21 are supported in this operative position by their associated abutments 35 and 36 respectively with the bottom edges 38 and 37 of the abutments 35 and 36 engaging the surface of the boat ramp to rigidly support the stops 20 and 21 in the operative position.

As the rearward movement of the boat trailer 45 continues, the centrally located front wheel 23 of the boat trailer 45 arrives at the plane of the stops 20 and 21 but is permitted to pass by them because the wheel moves through the central gap 22 which is formed by the spaced mounting of the bars 24 and 25. The stops 20 and 21 therefore do not interfere with the passage of the wheel 23 in a rearward direction with the trailer 45 as the latter is being moved down the boat ramp toward the water.

However, as the rearward movement continues, the rear wheels of the towing vehicle 46 engage the upright stop 20 and 21 and further passage of the vehicle 46 down the boat ramp 11 is barred. Thus, in FIG. 3, a left rear wheel 65 of the vehicle 46 is shown in engagement with the stop 20 for preventing any further rolling movement of the vehicle 46 down the boat ramp 11. The opposite rear wheel (not shown) of the vehicle 46 is in identical engagement with the stop 21. In this manner, the stops 20 and 21 provide for free passage of the boat trailer 45 down the boat ramp 11 for launching the boat being carried by the trailer but after the boat trailer has passed, the stops 20 and 21 become effective to prevent passage of the towing vehicle 46 beyond a point of safety to avoid endangering the towing vehicle.

When the boat is being removed from the water the trailer 45 is moved rearwardly toward the water to the position shown in FIG. 3 for receiving the boat. The vehicle 46 is again stopped by the operative stops 20 and 21 but proceeds forwardly from the position shown in FIG. 3 to tow the trailer 45 and the boat carried thereon from the water. The stops 20 and 21 are in an upright position at this time, but when the wheels 42 and 43 of the boat trailer engage the rear faces of the stops 20 and 21 they merely force the stops to pivot in a counterclockwise direction as viewed in the drawings from their operative positions to their inoperative positions shown in FIGS. 1 and 2 to permit free passage of the wheels 42 and 43 over the back faces of the stops 20 and 21.

It will be noted that the forward legs of the bell crank 50 and 52 are longer than the rear legs so that they are unbalanced to continually urge the bell cranks 50 and 52 in a pivotal movement in a counterclockwise direction as viewed in the drawings. Therefore, as soon as the wheels 42 and 43 release the bar 55, the bell cranks 50 and 52 pivot in the counterclockwise direction to produce slack in the chains 60 and 61 when the stops 20 and 21 are in their operative positions as shown in FIG. 3. However, because of the flexibility of the chains 60 and 61 such counterclockwise pivotal movement of the bell cranks 50 and 52 does not cause a corresponding pivotal movement of the stops 20 and 21. Instead, they remain in their operative position as illustrated in FIG. 3. On the other hand, since this slack exists in the chains 60 and 61, when the trailer is being removed from the water and the wheels 42 and 43 engage the back faces of the stops 20 and 21, the latter are free to pivot in a counterclockwise direction to their inoperative positions so that they do not interfere with the withdrawal of the trailer 45 from the water.

From the foregoing detailed description of the construction and operation of the illustrative embodiment of the present invention it will become apparent that a new and improved boat ramp safety stop has been provided that permits free passage of a boat trailer toward and away from the water but is automatically rendered effective to limit the passage of the towing vehicle beyond a safe position. The stop permits free passage of the rear trailer wheels as well as the single centrally located forward wheel of a three wheel trailer but is positively activated without the use of springs for effectively limiting the passage of the wheels of the towing vehicle.

Although the illustrative embodiment of the present invention has been described in considerable detail for the purpose of making a full disclosure of a practical operative arrangement by means of which the invention may be practised, it is to be understood that various novel features of the invention may be incorporated in other arrangements without departing from the spirit and scope of the invention as defined in the subjoined claims.

The principles of the invention having now been fully explained in connection with the foregoing description of embodying structure, I hereby claim as my invention:

1. In a boat ramp for passage of a boat trailer toward a body of water to launch a boat carried by the trailer while the latter is coupled to a towing vehicle; a frame secured to the surface of the ramp; a pair of stops carried by said frame in spaced relationship to present a central gap between them for permitting a centrally located front wheel of the trailer to pass through the gap, said stops being supported by said frame for movement between inoperative and operative positions and being movable to their inoperative positions by the rolling wheels of the boat trailer as the latter is being towed up the ramp away from the water; means for locating said stops in their operative positions; and actuating means spaced from stops and activated by the wheels of the boat trailer after they have passed over the inoperative stops toward the water, said actuating means functioning when activated to actuate said stops to their operative positions for preventing the passage of the towing vehicle beyond said stops.

2. In a boat ramp for passage of a boat trailer toward a body of water to launch a boat carried by the trailer while the latter is coupled to a towing vehicle; a stop supported on the ramp for movement between an inoperative position and an operative position; actuating means spaced from said stop in position to be activated by the wheels of the boat trailer after they have passed said stop while the latter is in its inoperative position, said actuating means functioning when activated to actuate said stop to its operative position for preventing the passage of the towing vehicle beyond said stop; and means providing for the passage of a centrally located single front wheel of the boat trailer beyond said stop while the latter is in its operative position.

3. In a boat ramp for passage of a boat trailer toward a body of water to launch a boat carried by the trailer while the latter is coupled to a towing vehicle; a frame secured to the surface of the ramp; a stop mounted on said frame for pivotal movement between an inoperative position and an operative position with the stop being pivotable to its inoperative position by the wheels of the boat trailer as the latter is being towed up the ramp away from the water; a bell crank pivotably carried by said frame; and an actuating rod connected to one end of said bell crank with the other end of said bell crank being coupled to said stop so that pivotal movement of said bell crank in one direction will pivot said stop from an inoperative position to an operative position, said actuating rod being located so that after the wheels of the boat trailer have passed the inoperative stop they engage the rod to actuate said bell crank in a pivotal movement for pivoting said stop to its operative position for preventing passage of the towing vehicle beyond said stop.

4. In a boat ramp for pasage of a boat trailer toward a body of water to launch a boat carried by the trailer while the latter is coupled to a towing vehicle; a frame secured to the surface of the ramp; a stop mounted on said frame for pivotal movement between an inoperative position and an operative position with the stop being pivotable to its inoperative position by the passage of the wheels of the boat trailer as the latter is being towed up the ramp away from the water; a lever pivotally carried by said frame; an actuating rod connected to one end of said lever with the other end of said lever being coupled to said stop so that pivotal movement of said lever in one direction will initiate pivotal movement of said stop from an inoperative position toward an operative position, said actuating rod being located to be engaged by the wheels of the boat trailer after they have passed the inoperative stop to shift said rod and thereby cause pivotal movement of said lever for initiating pivotal movement of said stop toward its operative position; and ballast on said stop in position to produce a force for completing the pivotal movement of said stop to its operative position after such movement has been initiated by said lever.

5. In a boat ramp for passage of a boat trailer toward a body of water to launch a boat carried by the trailer while the latter is coupled to a towing vehicle; a stop mounted on said ramp for movement between an inoperative position and an operative position; actuating means connected to be activated after the wheels of the trailer have passed said stop while it is inoperative, the activation of said actuating means serving to initiate the movement of said stop toward its operative position; and second actuating means on said stop to complete the movement of said stop to its operative position after such movement is initiated by said first actuating means.

6. In a boat ramp for passage of a boat trailer toward a body of water to launch a boat carried by the trailer while the latter is coupled to a towing vehicle; a stop mounted on said ramp for movement between an inoperative position and an operative position; actuating means connected to be activated by the wheels of the trailer after the wheels have passed the stop while it is inoperative, such activation of said actuating means serving to initiate the movement of said stop toward its operative position; and ballast on said stop in position to produce a force for completing the pivotal movement of said stop to its operative position after such movement has been initiated by said actuating means.

7. In a boat ramp for passage of a boat trailer toward a body of water to launch a boat carried by the trailer while the latter is coupled to a towing vehicle; a stop mounted on said ramp for pivotal movement between an inoperative position and an operative position, said stop presenting a gap to permit the passage of the front wheel of a boat trailer when said stop is in either of its two positions with the stop being pivotable to its inoperative position by the wheels of the boat trailer as the latter is being towed up the ramp away from the water; actuating means connected to be engaged by the rear wheels of the trailer after the rear wheels have passed said stop while it is inoperative, such engagement of said actuating means serving to initiate the pivotal movement of said stop toward its operative position; ballast on said stop to balance said stop for developing a force to complete the pivotal movement of said stop to its operative position after such movement has been initiated by said actuating means; and means for positioning said stop in its operative position after it has been pivoted thereo by said ballast; whereby the stop provides free passage for the wheels of the trailer but limits the passage of the towing vehicle down the ramp to a safe point established by the location of said stop.

References Cited by the Examiner
UNITED STATES PATENTS
3,011,596  12/1961  Eastman et al. _____ 188—32

DUANE A. REGER, *Primary Examiner.*